Jan. 13, 1959  K. D. McMAHAN  2,868,291
TIRE TRUING MACHINES
Filed Dec. 3, 1954  3 Sheets-Sheet 2
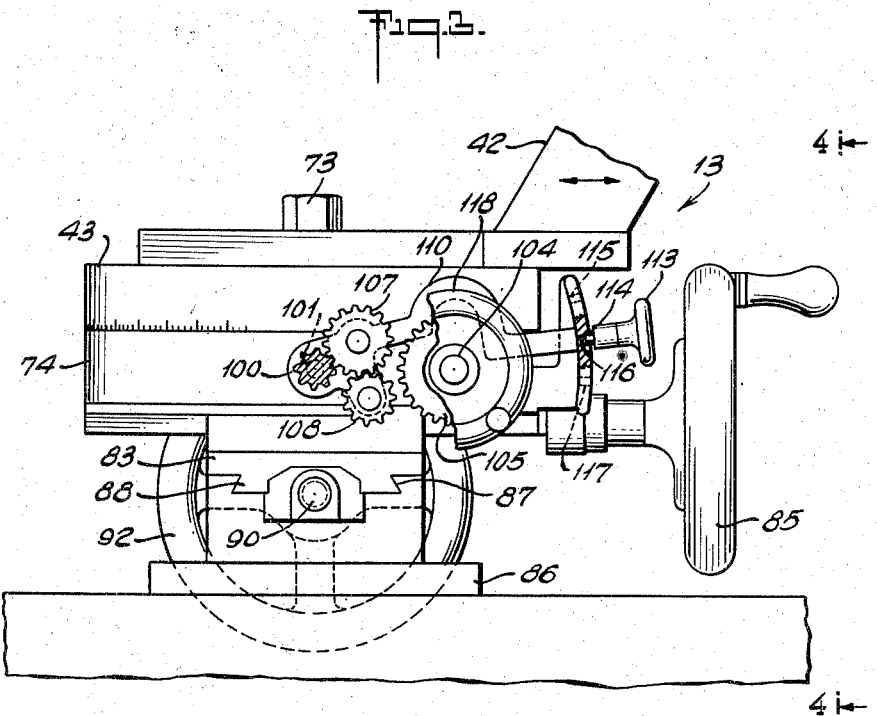
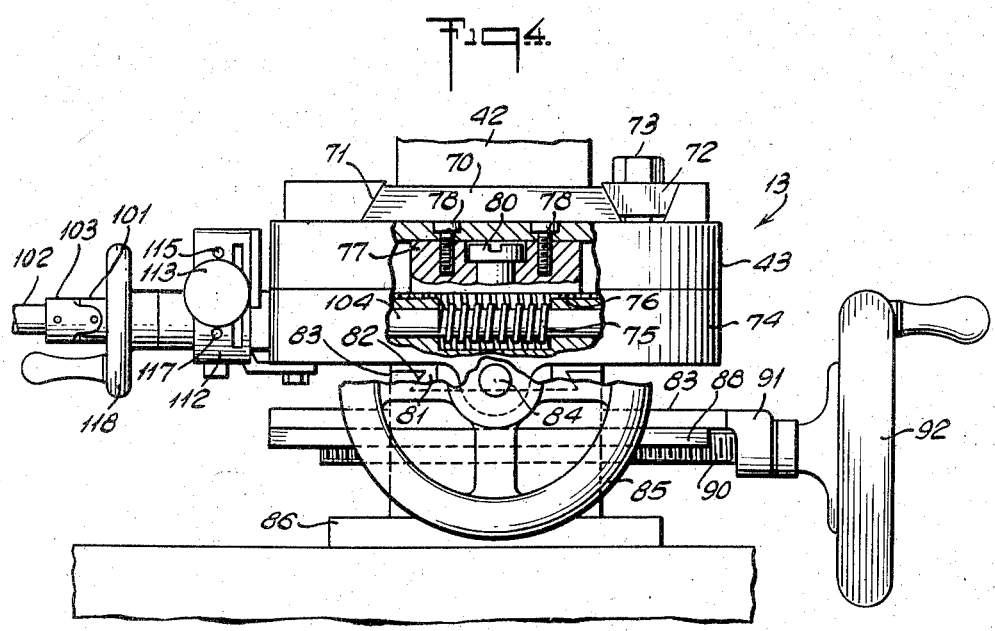
INVENTOR
KENTON D. McMAHAN
BY
C. Augustus Semma
ATTORNEY Jan. 13, 1959 K. D. McMAHAN 2,868,291
TIRE TRUING MACHINES Filed Dec. 3, 1954 3 Sheets-Sheet 3

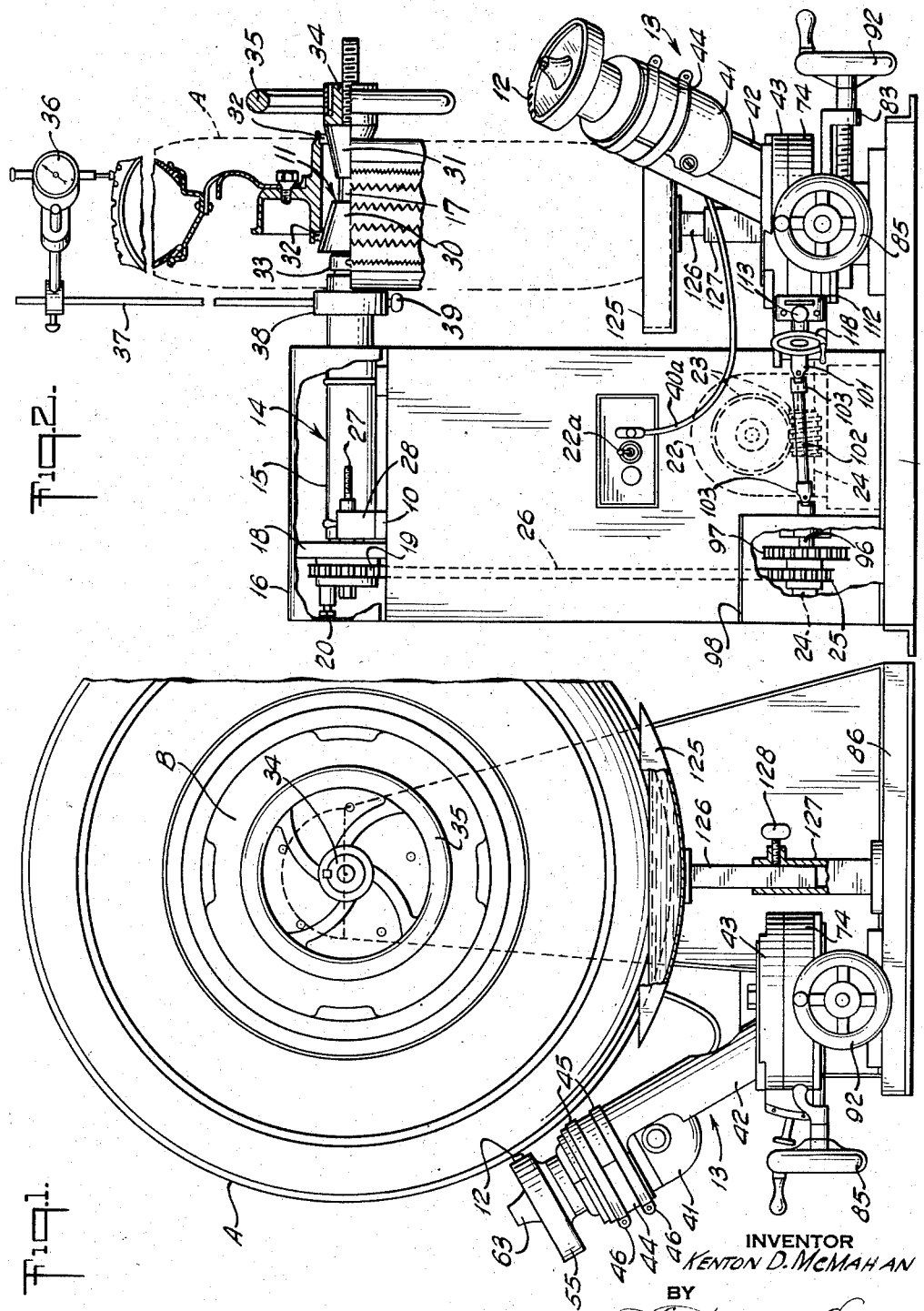

INVENTOR
KENTON D. McMAHAN
BY
/ ATTORNEY

United States Patent Office 2,868,291
Patented Jan. 13, 1959

2,868,291

TIRE TRUING MACHINES

Kenton D. McMahan, Scotia, N. Y.

Application December 3, 1954, Serial No. 472,807

7 Claims. (Cl. 164—61)

The present invention relates to a machine for truing or making round and concentric about its center of rotation an inflated pneumatic tire.

It is well known that completed tires as they come from the production molds are not round. The variations run all the way from 1/16 of an inch to 1/2 of an inch in extreme cases. This may result from many causes, the chief one being the uneven thickness of the tread resulting from high production methods of molding. Another cause is the tolerance of concentricity allowed in the manufacture of rims, wheels, hubs and their methods of attachment. Aside from the above causes of non-circularity in new tires and in new wheels, tires may in use become non-circular, due to uneven wear, accident or excessive braking.

As a result of the adverse conditions described above, the resulting unbalance in the wheel and tire in use causes dangerous vibrations and stresses to be set up in the chassis and mechanical parts of the vehicle, especially at high speeds, thereby causing serious damages and mechanical failures. These vibrations not only result in excessive wear of mechanical parts but create flat spots in the tire and increase the extent of non-circularity of the tire tread, so that the unfavorable tire conditions described become progressively worse.

One object of the present invention is to provide a new and improved machine for truing a tire to bring it to a contour perfectly circular about its axis of rotation.

Another object of the present invention is to provide a machine for truing a tire having new and improved means for supporting a tire in position thereon for rotation, said supporting means being designed to receive tire wheels of different sizes and types, without change in set up, and being operable to permit selectively, (1) drive of the supported tire for truing operations, (2) release of the tire for free rotation for gaging or other purposes, and (3) locking of the tire in position against rotation to allow for the setting and the adjusting of the cutter safely in proper position in relation to the locked tire before truing operations.

A further object is to provide a machine for truing a tire having new and improved cutter means designed for accurate, reliable, sensitive trimming of the high spots on the tire and having devices associated therewith to guide and lead the trimmings away from the cutting field orderly and safely, without catching or jamming between the cutter and the tire.

Various other objects of the invention are apparent from the following description and from the accompanying drawings, wherein Fig. 1 is a side elevation of a truing machine embodying the present invention;

Fig. 2 is a front elevation of the truing machine;

Fig. 3 is a side elevation of the cutter support for the truing machine;

Fig. 4 is a front elevation of the cutter support for the truing machine but with parts broken away to reveal the interior structure;

Figure 5:
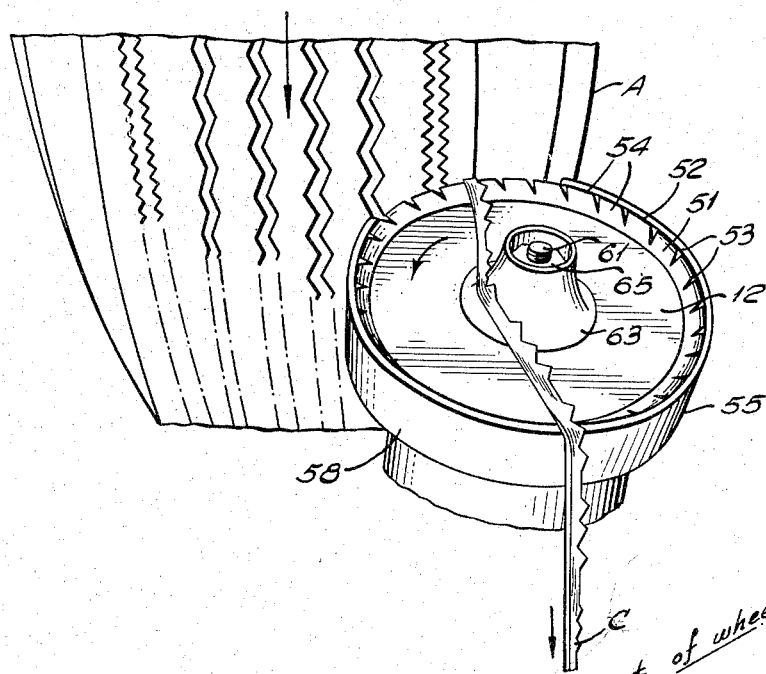
Fig. 5 is a fragmentary perspective showing the truing machine in action.

Referring to the drawings, the tire truing machine embodying the present invention comprises generally a frame 10, a support 11 on said frame for the tire A, a rotary cutter 12, and a support 13 on said frame for said cutter located directly below said tire support. The tire support 11 comprises a horizontal shaft 14 mounted on suitable bearings in the frame 10 and having one end section 15 extending into a housing 16 and having the other end section 17 projecting outwardly from said housing. For driving the tire support shaft 14, there is keyed or otherwise rigidly secured to said shaft in the housing 16, a disk 18 and mounted on said shaft for free rotation thereabouts is a sprocket wheel 19. A clutch bolt 20 on the hub of the sprocket wheel 19 is movable into a hole (not shown) in the disk 18, to lock the sprocket wheel 19 to the shaft 14, to power-drive the tire, or if desired to release said sprocket wheel to permit the tire to be turned by hand.

The power drive for the tire comprises a motor 22, mounted in the housing 16 near the bottom, and controlled through a switch 22a in the side of the housing 16 through a current outlet. This motor has a reduction gear connection 23 to a shaft 24 supported in suitable bearings in the frame 10. This reduction gear connection 23 may consist of a worm and worm wheel unit and the shaft 24 driven therethrough carries a sprocket wheel 25, which drives the sprocket wheel 19 on the tire support shaft 14 through a sprocket chain 26.

The tire support shaft 14 may be connected to the power drive or released therefrom selectively through the clutch bolt 20 in the manner described. The tire support shaft 14 may also be locked against rotation by means of a bolt 27 slidable in a fixed block 28 on the frame 10 in the housing 16 and into a hole (not shown) on the shaft disk 18, to hold the tire support shaft 14 against rotation. This hole is out of alinement with the hole into which the bolt 20 slides, to prevent both bolts 20 and 27 from being engaged at the same time, and to prevent thereby the locking of the motor 22. The locking of the tire support shaft 14 may be desirable, for example, while the tire is being mounted on said shaft and while the cutter 12 is being set up and adjusted for truing operations.

The tire support 11 is designed to sustain conventional tires and tire wheels of different sizes. For that purpose, the projecting shaft section 17 has splined thereon two cones 30 and 31, arranged in reverse relationship with their smaller ends confronting, to engage the outer races of the usual tapered roller bearings 32 used in the front wheels B of most automobiles. The cone 30 bears against a collar 33 affixed to the shaft 14 and the other cone 31 is slidable along said shaft, and both cones are keyed to the shaft for rotation therewith. The tire support shaft 14 has threaded on its outer end section a bushing 34 adapted to bear against the larger end of the cone 31, when the bushing is turned on said shaft end section. A hand wheel 35 is keyed to the bushing 34 to turn said bushing.

In supporting the front wheel B with tire A on the support device 11, the cone 31 and the bushing 34 with the attached handwheel 35 are removed from the shaft 14, and the wheel slipped over said shaft until one of the outer races of the roller bearings 32 seats partially over the cone 30 and bears thereagainst. The other cone 31 is then slipped over the shaft 14 and the bushing 34 carrying the handwheel 35 is threaded on the shaft 14 and bears against said cone. This forces the wheel B against the cone 30 and the cone 31 against the wheel, causing the opposite sides of the wheel bearings 32 to seat firmly on said cones. The bearings 32 on opposite sides of the wheel taper in opposite directions from the taper on the cones 30 and 31 on which they seat, so that wheels of different sizes can adapt themselves to the tire support 11 and their bearings can center themselves automatically thereon. For rear wheels, the rim and tire is mounted on a front wheel which is left on the machine shaft 14.

For gaging the concentricity of the tire surface, an indicating gage 36 is adjustably secured to a rod 37 connected to a collar 38 on the shaft 14. The axial and rotative positions of the collar 38 on the shaft 14 can be adjusted by means of a thumb screw 39 threaded in said collar and bearing against said shaft.

When it is desired to test the circularity of the periphery of the tire A through the gage 36, the shaft 14 is freed from the drive through release of the clutch bolt 20. This permits the tire A with the shaft 14 secured thereto to spin freely.

While the tire A is rotated at a comparatively slow speed through the shaft 14 by the power drive described, the rotary cutter 12 is power driven at high speed about its own axis, to trim the periphery of the tire and at the same time is power fed at comparatively slow speed horizontally across the tire, to cover the full transverse contour of the tire. To that end, the cutter 12 is secured directly to the shaft 40 of a motor 41 in a manner to be described, to drive the cutter at high speed about its own center, and the motor is mounted on a cutter head 42 which in turn is secured to a rotary feed table 43 forming part of the cutter support 13. This cutter motor 41 may be connected to the current outlet on the side of the housing, by means of an electric cord 40a.

The cutter head 42 is in the form of a post and is shown of substantially semi-cylindrical channel formation to receive snugly therein the cutter driving motor 41, and this motor is removably retained on said post by means of a semi-cylindrically curved clamping plate 44, fitted snugly over the motor opposite the post 42 are a plurality of metal straps 45 wrapped around the post and the clamping plate and having screw buckles 46, to fasten the ends of the straps together with adjustable pressure. This structural arrangement, although light in weight, holds the motor 41 and thereby the cutter axis firmly against vibration, and at the same time supports the motor in accessible position for lubrication and inspection and in such a manner as to permit easy assembly and disassembly.

Figure 6:
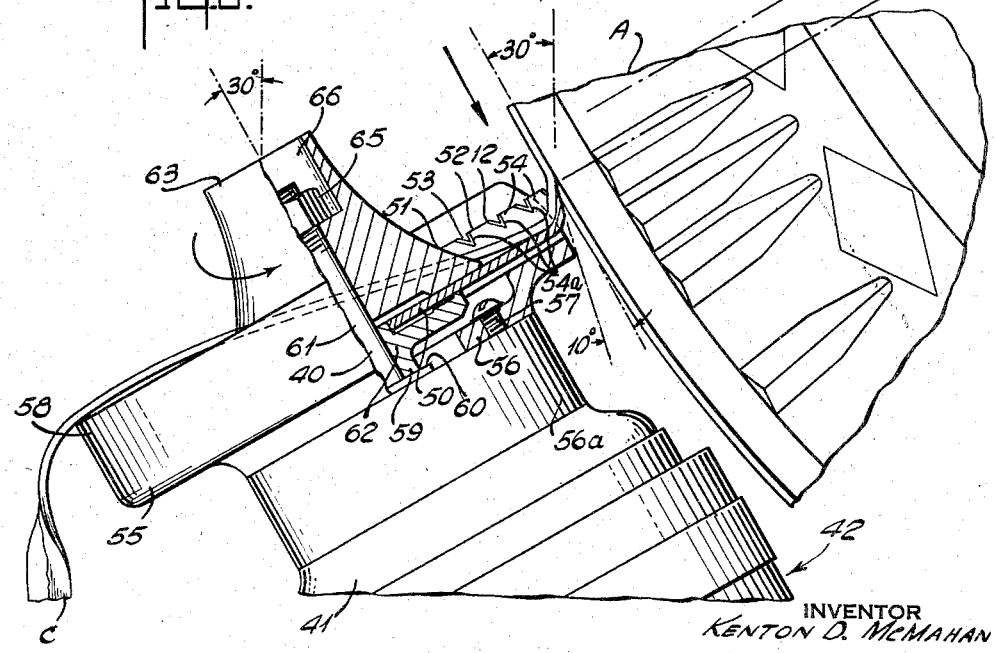
Fig. 6 is a side elevation of a fragment of the truing machine, showing the cutter in action and partly in section.

The cutter 12 is crown-shaped and consists of a flat base 50 (Fig. 6) and a conical circumferential flange 51 tapering towards its base and terminating at its rim in a cutting edge 52. In a specific example, the outside surface of the flange 51 has a tape of 10° with respect to a cylindrical surface concentric to the axis of the cutter and the inside surface of the flange has a taper of 30° with respect to this cylindrical surface, as shown in Fig. 6. This cutter flange 51 has a series of V-notches 53 to define a series of separate cutting teeth 54 and the side edges of these teeth are bevelled as shown. The bevelling of that side edge 54a of each cutting tooth 54 leading in relation to the direction of rotation of the cutter 12 provides a second cutting edge which in conjunction with the first cutting edge 52 is particularly useful to produce feathering cuts in the tire with accurate sensitive stopping and starting of these cuts. The notches 53 promote the starting and stopping of the cutter 12 with extremely light surface pressure of the cutter on the tread; otherwise the cutter would dig in and jam on the tread and fail to cut.

The cutter 12 is mounted in position, so that the axis thereof extends downwardly and inwardly towards the vertical plane of the axis of the tire support shaft 14 at an angle of about 30° with said plane and the cutting edge 52 of the cutter lies a small distance below and parallel to a plane passing through the center of said tire support shaft. With the cutter 12 so mounted, the cutter head or post 42 extends obliquely below the tire A and permits the cutter support 13 to be set almost directly below said shaft. This lends compactness and rigidity to the machine and reduces vibration to a minimum.

For protective purposes, a guard 55 is provided around the cutter 12. This guard 55 has a flat base 56 secured to the end bearing 56a on the end of the casing of the motor 41 by screws 57 and has a rim 58, projecting above the cutting edge 52 and extending around the cutter flange 51, except in the region where cutting action takes place.

The means for securing the cutter 12 to the shaft 40 of the cutter motor 41 comprises a chuck 59 embracing the shaft 40 and resting on an axially facing shoulder 60 on said shaft formed by reducing the end section 61 of said shaft, said chuck having an axial annular hub 62 and the cutter base 50 being seated on said chuck and having a hole through which said hub passes to center the cutter 12 about the motor shaft section 61. A spinner collar 63 is slipped over the motor shaft section 61 and bears against the cutter base 50, this collar being clamped against the said cutter base by means of a nut 65 threaded on the end of said motor shaft section. The collar 63 has a recess 66 into which the end of the motor shaft section 61 extends and terminates and in which the nut 65 is entirely housed so that the shaft section and the nut are protected against entanglement with the rubber trimmings C. Also, the collar 63 extends axially outwardly beyond the plane of the outer peripheral edge of the guard rim 58 and tapers outwardly and axially with convex curvature to serve as a spinner and to act thereby in conjunction with the guard 55 to lead and guide the rubber ribbon trimmings C from the tread orderly away from the cutting field, so that they do not become entangled in any part of the machine and especially between the cutter 12 and the tire A. The inclination of the cutter 12 downwardly and away from the cutting field and the corresponding inclination of the outer edge of the guard rim 58, further assists in leading and guiding the rubber ribbon trimmings C away from the cutting field, as shown in Figs. 5 and 6.

The cutter head or post 42 is secured to the rotary feed table 43 for rotary movement therewith and is adjustable radially thereof according to the transverse circular contour of the tire to be trimmed. For that purpose, the lower end of the post 42 is welded or otherwise rigidly secured to a gib 70 (Figs. 3 and 4) with tapering sides fitting in a recess 71 in the feed table 43, which is correspondingly tapered on one side and which receives a gib locking wedge bar 72 along the opposite side, held down by a stud 73. By loosening this stud 73, the gib 70 and thereby the cutter head or post 42 are adjusted radially with respect to the feed table 43 and by tightening this stud, the wedge bar 72 is clamped between one side of the gib 70 and the corresponding side of the gib recess 71, thereby locking the cutter head in radially adjusted position.

The rotary feed table 43 is rotated for cutter feed action across the tire, and to that end, there is provided a bed 74 having a drive worm 75 journalled therein and meshing with a gearing worm sector 76, which has a hub 77 affixed to the said table by means of studs 78 and which is supported for rotation by means of a pivot pin 80, passing through said hub and screwed into said bed. Rotation of the worm 75 rotates the gear sector 76 about the pivot pin 80, and since said pin is affixed to the bed 74 and said gear sector is affixed to the rotary feed table 43, this table rotates about the axis of the pivot pin for cutter feeding action.

To regulate the depth of the cut in the tire tread, the table bed 74 is adjustable in a direction at right angles to the tire support shaft 14. For that purpose, the bed 74 has a tapered guide extension 81 on its bottom fitted for slide movement in ways 82 on a support 83. Threaded in this support 83 is a feed screw 84, which is suitably journalled for rotation in bearings secured to the bed 74 and which is held against axial movement with respect to said bed. Secured to the end of this feed screw 84 is a handle 85 for cutting feed adjustment. By rotating this handle 85, the bed 74 is moved along the ways 82 on the support 83, and the depth of the cut effected by the cutter 12 is thereby adjusted.

It may be desired to locate the cutter 12 in any position transversely of the tire. For that purpose, the bed support 83 carrying the ways 82 for the bed 74 constitutes a slide connected to a fixed base 86 by means of a tapered way 87 on said base extending in a direction at right angles to the ways 82 for the bed 74, and receiving a correspondingly tapered tongue 88 on said support 83. A feed screw 90 journalled in bearings 91 carried by the bed support 83 and threaded into the base 86 carries a hand wheel 92, which upon rotation moves the support 83 along the base 86 into desired transverse position with respect to the tire.

The transverse circular feed of the cutter 12 at slow speed by means of the worm 75 and gear sector 76 and by means of the corresponding rotation of the table 43 is effected through a drive connection, comprising a shaft 96 (Fig. 2) supported on the frame 10 alongside of the shaft 24 in a housing 16, and a sprocket wheel and chain drive 97 between said shafts 24 and 96. The shaft 96 and part of the sprocket wheel and chain drive 97 are housed in a casing 98 forming a small extension of the housing 16. This shaft 96 projects to the outside of this casing 98 and drives the rotary feed table 43 through a change gear unit including a drive pinion 100 (Fig. 3) on a stub shaft 101 connected to the shaft 96 through a shaft 102 (Figs. 2 and 4) having universal connections 103 with said shafts 96 and 101 allowing for adjustment in the position of the bed 74 on its support 83. The worm 75 forming part of the table feed drive is mounted on a shaft 104 (Figs. 3 and 4), which carries a gear 105 (Fig. 3) in the plane of the drive pinion 100. Between the drive pinion 100 and the gear 105 is a transmission unit consisting of a gear 107 meshing constantly with the drive pinion and a gear 108 meshing constantly with the gear 107. The two gears 107 and 108 are journalled in an arm 110 supported on the stub shaft 101 for rotation thereabout and extending through a slot in an arcuate guide and lock plate 112. A handle bolt 113 on the end of the arm 110 carries a retractile bolt 114 adapted to be manipulated into any one of three locking holes 115, 116 and 117 in said plate according to the angular position of said arm. When the arm 110 is swung upwardly about the stub shaft 101 in its uppermost position and the bolt 114 is slipped into the hole 115, the gear 108 will be in mesh with the gear 105, so that the change gear unit will be set for lefthand table feed drive (Fig. 2). When the arm 110 is swung downwardly about the stub shaft 101 in its lowermost position and the bolt 114 is engaged in the hole 117, the gear 107 will be in mesh with the gear 105, so that the change gear unit will be set for reverse righthand table drive. When the arm 110 is swung into intermediate neutral position about the stub shaft 101 and the bolt 114 is engaged in the middle hole 116, the transmission to the gear 105 will be interrupted, as shown in Fig. 3, so that no power drive takes place. However, the shaft 104 of the gear 105 carries a handwheel 118, which permits the shaft 104 to be manually turned in this neutral position of the change gear unit, and the table 43 to be rotated to any selected position.

The cutter may be moved in either direction for cutting but it is preferred to move said cutter from right to left (Fig. 2).

For lubricating and cooling the cutter 12, there is provided a pan 125 (Figs. 1 and 2) adapted to contain a suitable liquid lubricant and coolant. This pan 125 is shaped in the form of a segment on a chord of a circle substantially concentric with the tire support shaft 14, and is large enough and is so located below said shaft to cause the lower side of the tire A on said shaft to dip into the lubricant and coolant in said pan as the tire is rotated. The lubricant and coolant thereby cools the tire, and at the same time is carried by the rotating tire into the cutting field of the cutter 12. The excess lubricant and coolant flows along the tire tread back into the pan 125.

The pan 125 is supported for height adjustment according to the size of the tire. To that end, the lower side of the pan 125 is rigidly secured to a depending stem 126 of rectangular cross section, slidable in an upright hollow column 127 of corresponding internal rectangular cross section, to receive slidably therein said stem, while holding said stem against rotation, said column being rigidly secured at the bottom to the base 86 of the machine. A thumb screw 128 in the side of the column 127 impinges on the stem 126 therein, to hold the pan 125 in the height adjusted position.

While the invention has been described with particular reference to a specific embodiment, it is to be understood that it is not to be limited thereto, but is to be construed broadly and restricted solely by the scope of the appended claims.

What is claimed is:

1. In a tire truing machine, a cutter device for the tire comprising a crown cutter having a circumferential flange terminating in a cutting edge, said cutter being rotatable about an axis centered in relation to said flange, a guard extending around said flange except in the region of the cutting side of said cutter, and a spinner connected to the center of said cutter for rotation therewith and defining a peripheral surface extending along said axis to permit the tire trimmings to be held by one side of said spinner surface in definite position in relation to said axis and to act with the peripheral edge of said guard to lead and guide the tire trimmings as they are cut away from the tire.

2. In a tire truing machine, a cutter device as described in claim 1, wherein said spinner tapers towards its outer end with concave curvature.

3. In a tire truing machine, a cutter device comprising a cutter head in the form of a post, a motor supported on said cutter head and having a shaft with an axially facing shoulder, a crown cutter having a base and a circumferential flange terminating in a cutting edge, and means for securing said cutter to said motor shaft, comprising a chuck on the inner side of said cutter resting on said shoulder for seating said cutter, a clamping collar on the outer side of said cutter base, said motor shaft extending through said chuck, through said cutter base and partially through said clamping collar, and said collar having a recess, the end of said motor shaft extending into said recess short of the outer end of said collar and being threaded, and a clamping nut on the threaded end of said shaft housed entirely in said recess inwardly of the outer end of said collar and bearing against said collar, a guard extending around the cutter edge except in the cutting region of the cutter, said collar extending axially outwardly beyond the peripheral edge of said guard to serve not only as part of the means for connecting the cutter to the motor shaft but also as a spinner to act with the peripheral edge of said guard to lead and guide the trimmings from the tire as they are cut.

4. In a tire truing machine, a horizontal tire support shaft, a crown cutter for trimming the high spots on the periphery of a tire supported on said shaft, having a circumferential flange tapering towards its base and terminating in a cutting edge disposed below the horizontal plane of the axis of said shaft, a cutter head for supporting said cutter in the form of a post extending in position to incline the axis of rotation of the cutter downwardly and inwardly towards the vertical plane of the axis of said shaft at an acute angle with said vertical plane, a guard around said flange except on the cutter side of said cutter having its peripheral edge above said cutting edge and in a plane inclined downwardly and away from said vertical plane, and a spinner connected to the center of said cutter for rotation therewith and defining a peripheral surface extending along the axis of rotation of the cutter to permit the tire trimmings to be held by one side of said spinner surface in definite position in relation to the latter axis and to act with the edge of said guard to lead and guide the tire trimmings away from the tire as they are cut.

5. In a tire truing machine, the combination comprising means for supporting a tire for rotation about an axis, a crown cutter for trimming the high spots on the periphery of the tire so supported having a circumferential flange terminating in a first cutting edge, said flange having a series of notches to form a plurality of separated cutting teeth, each with a circumferential first cutting edge at its outer end, means supporting said cutter into position for peripheral cutting action on the tire so supported and mounting said cutter for movements transversely of said axis towards and away from the tire and across the tread of the tire, means for rotating the tire about said axis in a direction to move the periphery of the tire across said cutting edge for cutting action, and means for rotating said cutter about an axis centered in relation to its cutting edge, the side edge of each cutting tooth leading in relation to the direction of rotation of the cutter being bevelled to provide a second cutting edge at said leading edge for trimming action.

6. In a tire truing machine, the combination as described in claim 5, wherein said cutter has a circumferential flange tapering towards its base.

7. In a tire truing machine, a horizontal tire support shaft, a crown cutter for trimming the high spots on the periphery of a tire supported on said shaft, said cutter having a circular flange terminating in a circular cutting edge disposed below the horizontal plane of the axis of said shaft and located in a plane, means supporting said cutter for rotation about an axis centered with respect to said cutting edge and extending downwardly and inwardly towards the vertical plane of the axis of the shaft at an acute angle thereto, the plane of said cutting edge being in the upper end of said flange substantially at right angles to said cutter axis, and means for supporting and guiding the trimmings as they are cut away from the tire clear across the top of said cutter in a direction sloping generally downwardly and away from the tire.

References Cited in the file of this patent
UNITED STATES PATENTS

| | | |
|---|---|---|
| 49,928 | Shillaber | Sept. 12, 1865 |
| 520,665 | Benham | May 29, 1894 |
| 959,140 | Hope | May 24, 1910 |
| 1,417,627 | Putt | May 30, 1922 |
| 1,527,194 | Kelly | Feb. 24, 1925 |
| 1,624,913 | Ames | Apr. 19, 1927 |
| 1,891,789 | Wheeler | Dec. 20, 1932 |
| 1,958,122 | Ambler | May 8, 1934 |
| 2,048,947 | Piquerez | July 28, 1936 |
| 2,061,581 | Lippincott | Nov. 24, 1936 |
| 2,105,316 | Fleming | Jan. 11, 1938 |
| 2,237,925 | Chaikin | Apr. 8, 1941 |
| 2,492,783 | Chamberlain | Dec. 27, 1949 |
| 2,504,957 | Baker | Apr. 25, 1950 |
| 2,654,430 | Csigi | Oct. 6, 1953 |
| 2,675,075 | Constantakis | Apr. 13, 1954 |